June 5, 1945.　　　A. M. THOMSEN　　　2,377,592
METHOD OF MAKING MAGNESIA FROM DOLOMITE
Filed Jan. 7, 1942
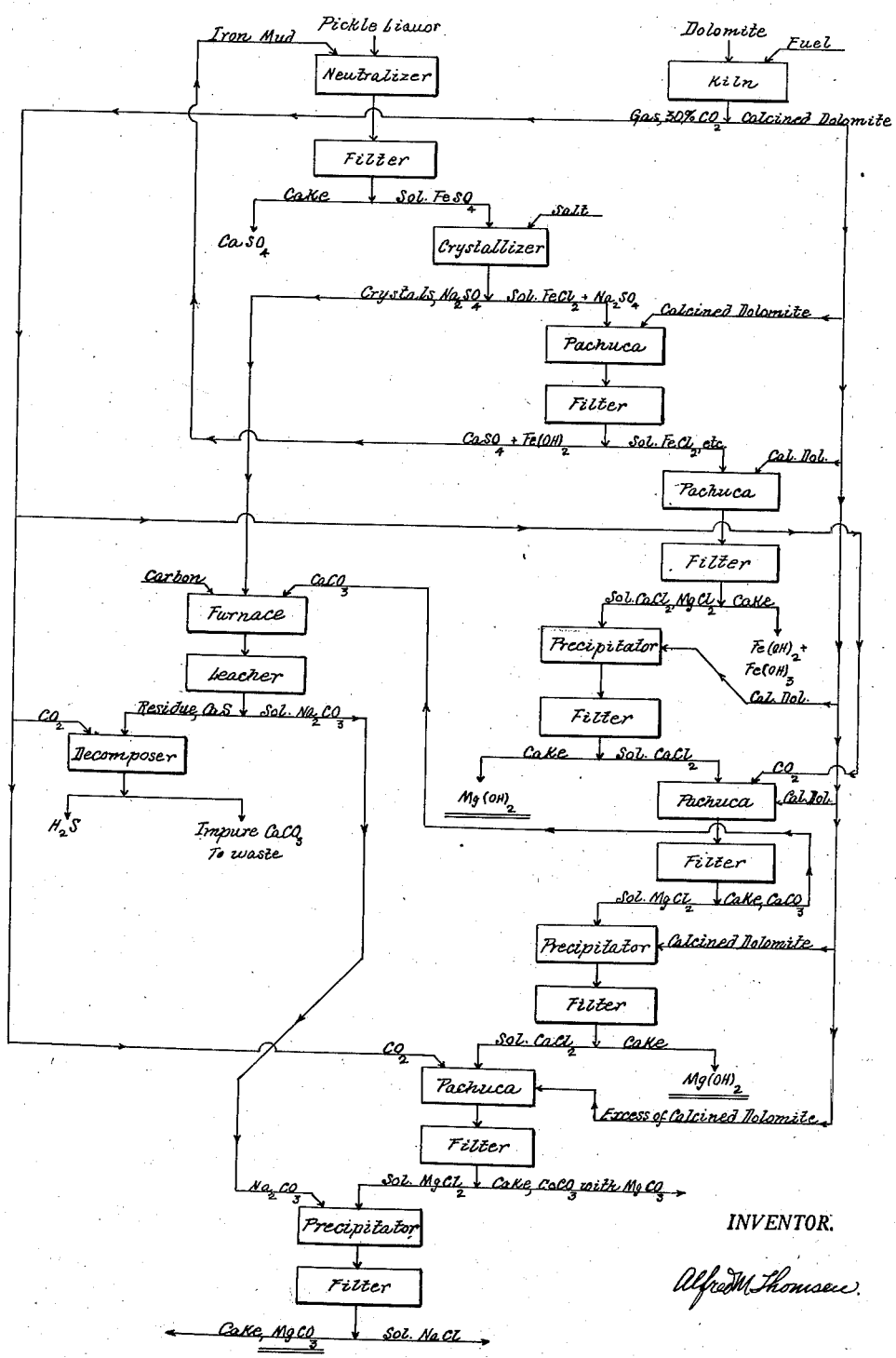
INVENTOR.
Alfred M. Thomsen.

Patented June 5, 1945

2,377,592

UNITED STATES PATENT OFFICE 2,377,592

METHOD OF MAKING MAGNESIA FROM DOLOMITE

Alfred M. Thomsen, San Francisco, Calif.

Application January 7, 1942, Serial No. 425,859

2 Claims. (Cl. 23—201)

Technically considered dolomite is a mineral consisting of calcium carbonate and magnesium carbonate in molecular proportions. It has its own specific uses as such being a rather ornamental building stone. In the calcined form it is of great value to the steel maker as it is used to renew continually the bed of the open hearth furnace. In this form it also serves as the raw material for the manufacture of that type of magnesium carbonate that is used as insulating material, i. e., "85% magnesia pipe covering"; the method of extraction being the preferential solution of the magnesia content in the presence of carbon dioxide and subsequent precipitation of same as basic carbonate by boiling.

In this manner a very pure and rather expensive product is obtained which has a large technical usage in a field where the product obtained by me has little if any application. I state this specifically in order that there may be no conflict between the process I disclose herein and the well known process of today, the two are entirely distinct both as to process and utilization of the product.

In the insulating field the importance lies in physical structure as well as in chemical analysis, in my process I aim at a product which belongs in the calcined form as a high grade type of refractory, and where physical characteristics are destroyed by subsequent calcination.

Instead of employing this preferential solubility of magnesium bicarbonate over calcium bicarbonate I employ sundry chemical compounds entirely distinct from dolomite, to wit: common salt and the "pickle liquor" of the steel industry, a more or less acid solution of ferrous sulphate. While I do use carbon dioxide I use it in the following reaction:

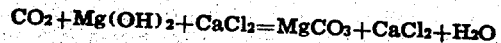

$$CO_2 + Mg(OH)_2 + CaCl_2 = MgCO_3 + CaCl_2 + H_2O$$

I may likewise use it to improve the filtering properties of magnesium hydrate by a partial carbonatation, but in no case do I use it to prepare a solution of bicarbonate, as in the technical process of today.

A preferred form of an assembly of all my steps is indicated upon the attached flow sheet, but the context of the claims will indicate that this assembly may be abbreviated to a certain extent without injuring the process and depending entirely upon local conditions, and one part can exist by itself involving the use of nothing except the products of the calcining kiln.

Meanwhile, to render the ensuing text more understandable I will make a few observations on the type of magnesia that is required in refractories. For many years this want, which is a very large one, has been covered by importations of "dead burned magnesite" but during the last world war the Austrian supply was cut off and recourse was had to magnesite deposits of the far West. Such material is necessarily quite impure and varies much in price according to the presence or absence of certain impurities as well according to the content of magnesium oxide.

It is the aim and object of my process to set our local industrial use of refractories free from this dependence upon distant sources, such as the Pacific Coast, and to emancipate it forever from dependence upon foreign sources of supply, for dolomite is very abundant in many places while magnesite is scarce.

In my preferred version I take advantage of the before mentioned "pickle liquor" the disposal of which is an unsolved difficulty and of common salt, both of which are very abundant in the locality where our great steel centers are located. It goes without saying that the high temperatures used in this industry makes it a foremost user of refractories. In the same localities it is also almost providential that dolomite is most abundant so all the requirements are found in close juxtaposition to the principal market for the finished product.

My process starts with the calcination of the dolomite in which two products are obtained namely, a kiln gas with about 30% carbon dioxide, and a calcined dolomite which is a mixture of the oxides of calcium and magnesium, together with such impurities as silica, iron, alumina, etc. occurring in the natural rock. It is essential in this step that the process be conducted at a lower temperature than is customary in making this product for the steel industry. A "dead burned dolomite" suitable for the open hearth would be most unsuited for the reactions now to be described.

I now combine this calcined dolomite with the pickle liquor but in an indirect manner. Were the two commingled directly then a precipitate of calcium sulphate and hydrate of iron would be obtained in a solution of Epsom salts. To avoid this situation I first add common salt to the pickle liquor and separate by crystallization the major part of the sodium sulphate thus obtained. The mother liquor thus becomes a solution of ferrous chloride containing some sodium sulphate. A small addition of calcined dolomite is next added and a relatively small amount of the formerly described mixture of calcium sulphate and iron hydrate is obtained. This is removed and to the filtrate or otherwise clarified solution enough calcined dolomite is added to precipitate all the iron. As the excess of sulphates has now been removed this precipitate consists solely of a hydrated oxide of iron with some impurities from the dolomite.

Two by-products thus appear, namely sodium sulphate and this iron precipitate which, owing to the absence of sulphur ranks as an acceptable iron ore. The impure mixture of calcium sulphate and iron oxide, discarded in the intermediate step, can be usefully employed to neutralize the original pickle liquor which is generally discarded in a highly acid condition. This step is indicated on the flow sheet but would, of course, be dispensed with if the pickle liquor were really a solution of copperas, the acid having been removed for reuse as is occasionally done.

The filtrate from the iron precipitation is a solution of magnesium and calcium in the form of chlorides. To this is now added a further quantity of calcined dolomite, sufficiently agitated and held until the magnesium chloride has been precipitated by the calcium oxide in the calcined dolomite. The result is, therefore, a precipitate of magnesium hydroxide, commingled with the residual magnesium oxide of the calcined dolomite, contaminated with such insoluble residual materials as have been introduced with the dolomite. It is, however, very low in lime as most of that constituent of the dolomite has been rendered soluble and occurs as calcium chloride in the solution.

Said solution is again commingled with calcined dolomite and treated, preferably in a Pachuca tank, with gas from the kiln. Interaction takes place according to the equation before given and a solution of magnesium chloride is obtained together with a residue consisting in part of the residual lime of the calcined dolomite and in part of calcium carbonate precipitated out of the solution, while any excess of calcium chloride not thus affected remains commingled with the magnesium chloride. Sediment and solution are now respectively treated as about to be described. It is evident that if additional calcined dolomite be added to the solution as already described without any use of carbon dioxide, then a further precipitate of magnesium hydroxide will be obtained identical with that formerly obtained.

The sediment will manifestly be a mixture of precipitated calcium carbonate and residual impurities and this is now employed in the following manner. It is commingled with the impure sodium sulphate from the primary pickle liquor step and sufficient reducing carbon of any type to combine with the oxygen of the sulphate. On fusing, a magma is obtained which is best lixiviated by running it through a tube mill with sufficient water to make a filterable slurry. This slurry is next filtered and yields a solution of sodium carbonate and a filter cake of calcium sulphide. In this reaction, iron, which perhaps would prevent the marketing of said sulphate as "salt cake" becomes innocuous.

This calcium sulphide could not be discarded "as is" due to unavoidable decomposition later on but freshly prepared it is not objectionable. It is treated with a further quantity of kiln gas and converted into calcium carbonate, this time too impure for re-use and hence discarded. The sulphur of the calcium sulphide has been eliminated as hydrogen sulphide. This gas can manifestly be burned and the resulting sulphur dioxide once more converted into sulphuric acid or, if desired, into sulphur itself by conventional means. It should be noted, however, that in this manner both the iron and the sulphur of the pickle liquor have been recovered for reuse, the one for use in the blast furnace, the other for use in the pickle tank. Simultaneously, the dolomite has been converted from a relatively worthless rock into a high grade refractory very much in demand by the industry that produced the pickle liquor. The salt employed to effect that result has meanwhile been converted from an equally cheap substance into the far more valuable form of sodium carbonate. Throughout, I prefer to conduct these operations in Pachuca tanks, particularly where iron is present. Under the influence of the circulating air a large part of the iron is oxidized to the ferric state and in this manner better filtration is obtained, also owing to the acid nature of this salt a better utilization of the dolomite.

The need for a careful calcination has already been stressed. A further refinement will consist in slacking the calcined dolomite before its addition to the precipitation tanks. In this manner sundry coarse impurities and badly calcined fragments can be eliminated with consequent benefit to the resultant products. It should be noted that the finished product will contain but one-half of the customary impurities, with the exception of lime, present in the dolomite as these will be discarded in the solution stage.

Greater economy of dolomite in this solution stage and better elimination of lime in the precipitation stage can be effected if the use of the dolomite will be in accordance with the practice disclosed in my U. S. Patent No. 1,965,268, entitled improvement in the Use of lime in precipitation. The countercurrent effect prescribed therein, the breaking down of gelatinous envelopes by attrition as partly expended solid residues are passed from stage to stage, and finally the use of carbonatation to enhance filtration all find their application in the herein described process for making a high grade magnesia product from dolomite.

An exceedingly pure magnesia can be produced if the sodium carbonate solution produced in the operation be contacted with a magnesia solution from which the lime has been entirely abstracted by the use of an excess of calcined dolomite and a prolonged treatment with kiln gas. Normally, purchased sodium carbonate could not be employed for this purpose but the solution resulting from leaching the fused calcium carbonate-sodium sulphate-carbon mixture is not "purchased soda ash" though it could be converted into such. Being a by-product it will be exceedingly cheap and can therefore be advantageously employed. While it could be sold as the high grade product it is, it could also be employed to increase the magnesium content of the formerly described dolomite product. This would best be done by commingling all three magnesia precipitates and calcining for MgO.

Not shown upon the flow sheet but evidently applicable would be the step of removing all or part of the sulphates resident in pickle liquor by the addition of calcium chloride, obtained at a subsequent step in the process, and removing the calcium sulphate thus produced. The resultant solution of iron chloride could then be contacted with calcined dolomite in the identical manner before described. Such a short cut might under certain conditions be advisable particularly if there were no desire to obtain a very high grade product such as that produced by precipitation with sodium carbonate.

Having thus fully described my process, I claim:

1. The method of making magnesia from dolomite which comprises: An initial treatment of a sulphuric acid pickle liquor by commingling same with sodium chloride and crystallizing out the major part of the sulphates resident therein in the form of sodium sulphate; commingling the resultant mother liquor with sufficient calcined dolomite to insure the precipitation of substantially all the remaining resident sulphates of the pickle liquor in the form of iron mud, a mixture of calcium sulphate and iron hydroxides; separating said iron mud from the solution containing principally chlorides of iron; commingling said solution with sufficient additional calcined dolomite to insure the precipitation of the resident iron as iron hydroxides free from calcium sulphate; separating said precipitate of iron hydroxide from the solution now containing chiefly the chlorides of calcium and magnesium; commingling said solution with a further addition of calcined dolomite in sufficient amount to precipitate the magnesium resident therein so as to obtain a solution consisting essentially of calcium chloride and suspended therein a precipitate of magnesium hydroxide commingled with the residual magnesia of the calcined dolomite; finally, separating said suspended solids from said residual solution of calcium chloride.

2. The method of making magnesia from dolomite as set forth in claim 1, with the added step that the "iron mud" produced therein, and consisting of a mixture of calcium sulphate and iron hydroxide, be separated into its constituents by commingling same with raw pickle liquor, prior to its treatment with salt, whereby the iron is dissolved and the calcium sulphate is left as a suspended solid which is removed prior to the addition of salt.

ALFRED M. THOMSEN.